United States Patent [19]

O'Meara

[11] 3,967,899
[45] July 6, 1976

[54] METHOD AND APPARATUS FOR MAINTAINING FAR FIELD SPATIAL COHERENCY IN ELECTROMAGNETIC TRANSMITTING SYSTEMS

[75] Inventor: Thomas R. O'Meara, Malibu, Calif.

[73] Assignee: Hughes Aircraft Company, Culver City, Calif.

[22] Filed: Dec. 30, 1974

[21] Appl. No.: 537,214

[52] U.S. Cl. ............................... 356/5; 250/199; 250/553; 250/203 R; 350/295; 356/152
[51] Int. Cl.² .................... G01C 3/08; G01B 11/26
[58] Field of Search ............ 356/5, 152; 250/203 R, 250/553, 199; 343/854, 100 SA; 332/7.51; 350/295

[56] References Cited
UNITED STATES PATENTS

| | | | |
|---|---|---|---|
| 3,202,991 | 8/1965 | Howells | 343/854 |
| 3,346,738 | 10/1967 | Rogers et al. | 356/141 |
| 3,644,043 | 2/1972 | Jones et al. | 356/5 |
| 3,691,483 | 9/1972 | Klein | 332/7.51 |
| 3,731,103 | 5/1973 | O'Meara | 356/5 |
| 3,764,213 | 10/1973 | O'Meara | 332/7.51 |
| 3,825,845 | 7/1974 | Angelback et al. | 332/7.51 |
| 3,878,520 | 4/1975 | Wright et al. | 343/100 SA |

*Primary Examiner*—Maynard R. Wilbur
*Assistant Examiner*—S. C. Buczinski
*Attorney, Agent, or Firm*—Lawrence V. Link, Jr.; W. H. MacAllister

[57] ABSTRACT

A system for controlling the relative phasing of a plurality of transmitting subapertures such that the energy transmitted therethrough is in phase at a distant location. In accordance with the invention, the transmitting subapertures are sequentially controlled so as to apply phase perturbations to different orthogonal spatial sets thereof; and in response to received reflected energy the relative size of the phase error is computed for each set and compensating phase offsets are provided.

10 Claims, 8 Drawing Figures

3,967,899

METHOD AND APPARATUS FOR MAINTAINING FAR FIELD SPATIAL COHERENCY IN ELECTROMAGNETIC TRANSMITTING SYSTEMS

BACKGROUND OF THE INVENTION

This invention relates to the method of an apparatus for establishing spatial coherency in electromagnetic energy transmitting systems; and particularly to such method and apparatus which use discrete iterative phase corrections across the transmitting aperture to establish far field phase coincidence across the transmitted beam.

In energy transmission systems such as laser transmitting arrangements, for example, atmospheric inhomogeneities and/or phase unbalances in the aperture feed system cause undesirable spreading of the transmitted beam. My U.S. Pat. No. 3,731,103 discloses basic techniques for establishing phase coincidence in such energy transmission systems. For example, in accordance with the just cited patent, optical arrays are separated into N effective subapertures with continuous phase control being effected on the radiation from each subaperture such that the energy propagated along all channels is in phase at a common remote location.

The subject invention extends the developments in this area of technology and has the advantage of being more readily adaptable to digital implementations than the prior art continuous (all channels being controlled simultaneously) "tagging" and control approaches.

SUMMARY OF THE INVENTION

It is a primary object of the subject invention to provide a new and improved method of and apparatus for compensating for phasing errors in energy transmission systems.

Another object of the invention is to provide systems, which are adaptable to digital control, for compensating for phasing errors in electromagnetic energy transmission arrangements.

It is a further object of the invention to provide improved optical systems which are capable of compensating for phase errors across the transmitted beam by means of discrete iterative corrections of the phasing of the transmitting subapertures.

In accordance with the subject invention, spatial coherency in an energy transmission system is maintained by sequentialy applying phase perturbations to the transmitting subapertures so as to form orthogonal spatial sets thereof, and in response to received reflected energy the relative size of the phasing error associated with each of the sets is computed and phase offsets which balance out the measured error components are provided. As used herein the term orthogonal spatial sets refers to the division of the transmitting aperture area into various ensembles or aggregate collections of subapertures with a first portion thereof forming one-half of one set and the remaining portion the second half of that set. The phase error coefficients are measured by sequentially inserting small trial phase perturbations into each half of a spatial set, measuring the resultant received electromagnetic energy and computing the phase error coefficients as a function of the change in the measured received energy. After the phase error coefficients are computed for a given spatial set then the offset (correcting) phase shift is provided before the error coefficients for the next set are measured. For example, in accordance with this method the error measurement and correction process could commence with the sets having the lower spatial frequency distribution with sequentially progress through to sets having higher spatial frequency distributions. The sets having the larger segment sizes exhibit lower spatial frequency distribution with respect to the phase error measurement and correction operation.

BRIEF DESCRIPTION OF THE DRAWINGS

The novel features of this invention, as well as the invention itself, will be best understood from the accompanying description taken in connection with the accompanying drawings in which like reference characters refer to like parts and in which.

DETAILED DESCRIPTION OF THE PREFERRED EMBODIMENT

Figure 1:
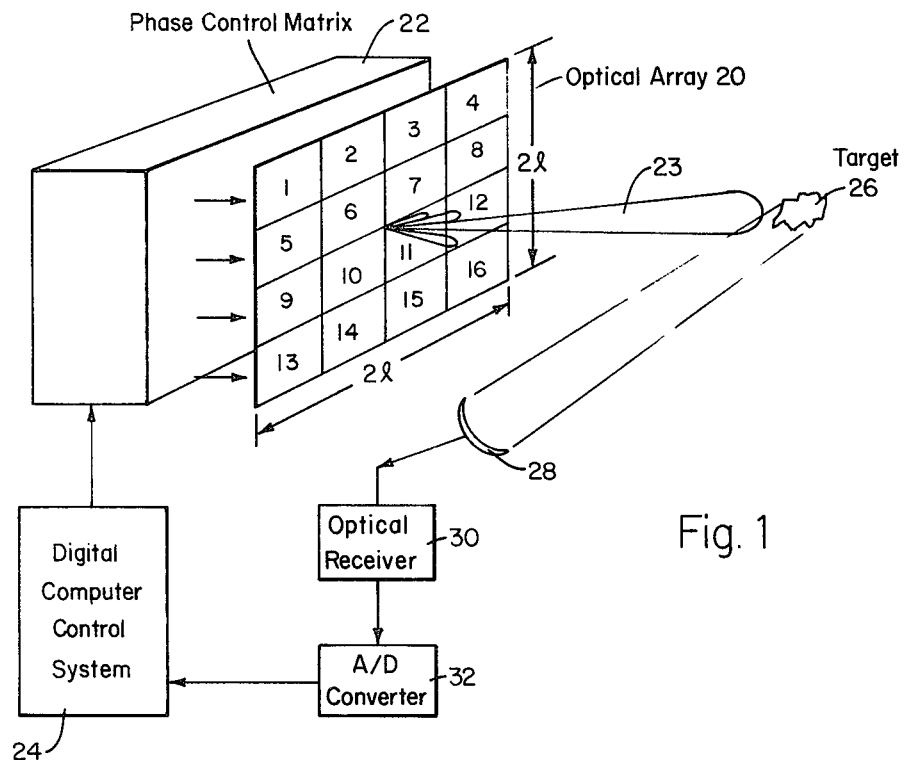
FIG. 1 is a block diagram of an electromagnetic transmitting system which incorporates the principles of the subject invention for maintaining far field spatial coherency.

In the embodiment of FIG. 1, an optical array 20 comprises a 4 × 4 matrix of subapertures and the relative phase of the signals radiated from each subaperture is controlled by a control matrix 22 which in turn is responsive to output signals from a digital computer 24. As will be described hereinafter, in particular with respect to FIGS. 2 through 5, computer 24 sequentially programs phase perturbations into different orthogonal spatial sets of the subapertures; and in response to the intensity of the signal reflected from a target 26 computes the relative value of the phase correction required to bring the energy transmitted through all the subapertures into spatial coherency at the target. The energy reflected from target 26 is received by an optical antenna or telescope 28 is processed by an optical receiver 30 and an analog-to-digital (A/D) converter 32 and is then applied as input data to computer 24.

As used herein the term orthogonal spatial sets refers generally to ensembles or aggregate collections of transmitting subapertures.

Figure 2:
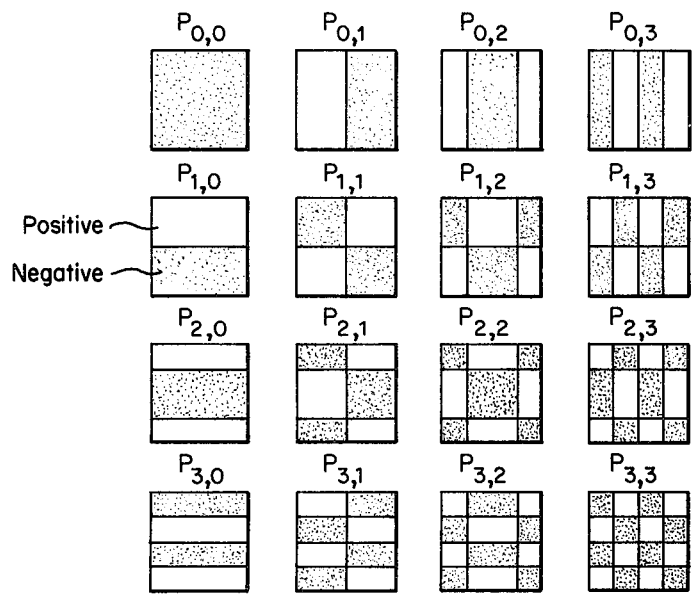
FIG. 2 depicts orthogonal spatial sets which are applicable to the system of FIG. 1.

An example of a suitable set of orthogonal functions for the 4 × 4 transmitting array of FIG. 1 is depicted in FIG. 2. In general these orthogonal sets may be generated by Walsh functions and can be derived for any type of transmitting aperture configuration in accordance with the teachings of the text entitled "Transformation of Information By Orthogonal Functions", Second Edition, by Henning F. Harmuth, New York, Springer-Verlag, in 1972.

In accordance with the symbology used in FIG. 2, each set comprises two equal area portions of the transmitting aperture. For example, the set designated $P_{1,0}$ has a first portion which comprises subapertures 1 through 8 of FIG. 1 and a second portion which comprises subapertures 9 through 16. By way of further example, in the illustration of FIG. 2 the set designated $P_{3,3}$ comprises a first portion which includes subapertures 1, 3, 6, 8, 9, 14 and 16 and a second equal area portion comprises subapertures 2, 4, 5, 7, 10, 11, 12, 13 and 15.

In accordance with the method of the subject invention, a small trial phase perturbation e.g. 20°, is applied to each subaperture of one-half of a given set of subapertures and the resultant received field intensity is measured. Next the same phase perturbation is applied to the other half of the given set and the received field intensity is again measured. The difference between these two received field intensities is used to compute an estimate of a phase correction which is applied to one-half of the subaperture elements of the set so as to decrease the phase unbalance of the transmitted energy at the target. This just described procedure is repeated for each of the applicable sets.

For the sets depicted in FIG. 2, the spatial frequency thereof increases from left to right down the main diagonal of the figure; and the preferred method is to commence with the lower spatial frequency distributions and to sequentially progress through the higher frequency distribution sets. After the error coefficients for a given set are measured, the corresponding fixed phase offsets (corrections) are applied before the error coefficients for the next set are measured. Since the set coefficient extraction method is approximate, iterative correction and checks may be utilized if the magnitude of the error coefficients are large. In general, the lower spatial frequency sets will represent the largest part of the phase error, and recycling only a few of these sets may suffice, particularly in systems in which it is desirable to minimize the response time.

More specifically, the phase error distribution associated with a given set, such as set $P_{2,2}$ for example, is $$\theta_{2,2}(x,y) = K_{2,2} P_{2,2}(x,y). \qquad (1)$$

where the coefficients $K_{2,2}$ are first measured and phase offsets are provided to reduce the value of the error coefficients. This measurement is accomplished by introducing a small trial phase perturbation set, designated generally by $\psi_{n,m}$ across the aperture. For example, for the subaperture set $P_{2,2}$ the phase perturbation set $\psi_{2,2}$ would comprise a small phase shift, such as 20° for example, inserted into subaperture elements 1, 4, 6, 7, 10, 11, 13 and 16 (see FIGS. 1 and 2). For the general case resultant far field intensity as measured by receiver 30 (FIG. 1) and applied through A to D converter 32 to computer 24 may be expressed as $$I_{+,n,m} \quad K+k \int_{-l}^{l} \int_{-l}^{l} \theta_e(x,y)\psi_{n,m}(x,y)dx\,dy. \qquad (2)$$

Similarly, if the reverse phase perturbation is introduced across the aperture then the resultant field intensity could be expressed as $$I_{-,n,m} \quad K-k \int_{-l}^{l} \int_{-l}^{l} \theta_e(x,y)\psi_{n,m}(x,y)dx\,dy. \qquad (3)$$

For example for the set $P_{2,2}$ a phase shift of 20° would be applied to subaperture elements 2 and 3, 5 and 8, 9 and 12, and 14 and 15. Computer 24 subtracts these last two noted field intensities to obtain $$I_{n,m} = I_{+,n,m} - I_{-,n,m}$$
$$= 2k \int_{-l}^{l} \int_{-l}^{l} \theta_e(x,y)\psi_{n,m}(x,y)dx\,dy. \qquad (4)$$

The integral of Equation 4 is of the usual form for obtaining the coefficient of the said component $\psi_{n,m}$ that is the error components of $P_{n,m}$ is proportional to $I_{n,m}$ or $$\theta_{n,m} \sim I_{n,m} \qquad (5)$$

Programming techniques for controlling computer 24 to implement the above described perturbation application steps and for solving Equation (4) to produce the error coefficients are well known in the art.

The correction value of $-\theta_{n,m}$ is added as a prelude to subsequent measurements; and it is noted that if the measurements for a given set were repeated rather than progressing to the next higher spatial frequency subaperture set, the integral represented by Equation (4) would be greatly reduced.

To summarize the above outlined method, a typical operational sequence could comprise measuring $I_{0,1}$, computing and introducing the phase correction $-\theta_{0,1}$ to the positive one-half of the subaperture elements of set $P_{0,1}$; measuring $I_{1,0}$, computing and adding $-\theta_{1,0}$ to the positive one-half of the subaperture elements for set $P_{1,0}$; repeating the above described steps for all the applicable subaperture sets and recycling as required until all $I_{n,m}$ are less than a specified value K.

Figure 3:
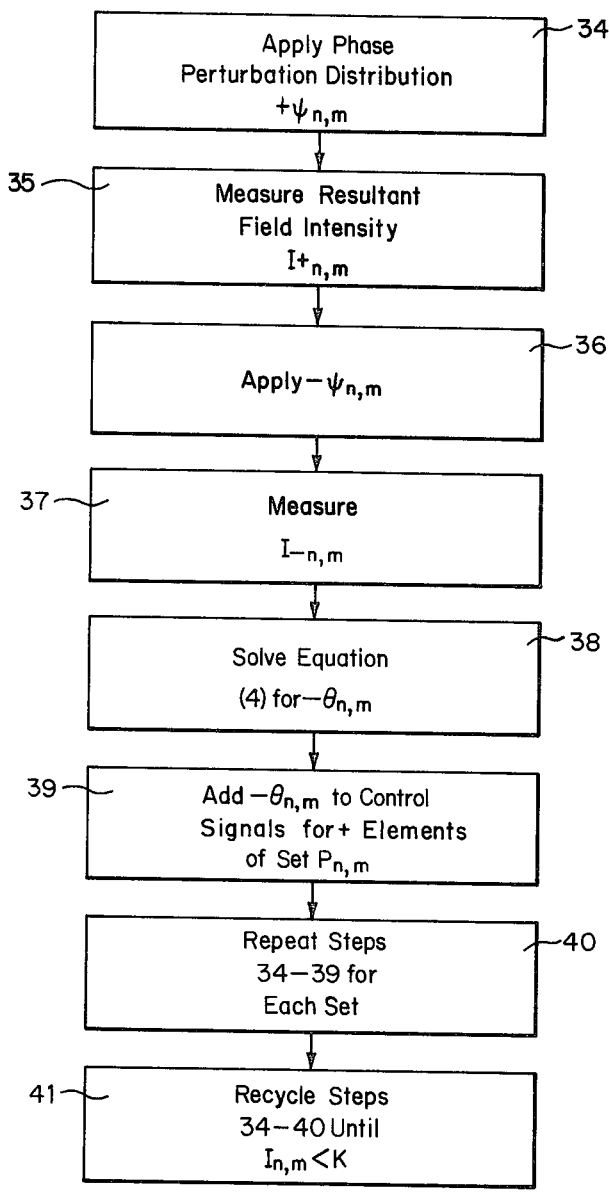
FIGS. 3 through 5 are diagrams which summarize the method for maintaining far field spatial coherency in accordance with the subject invention.

The method for maintaining spatial coherency in the electromagnetic energy transmitting system is depicted in FIG. 3 as comprising the following steps. As indicated by block 34 the first step is applying phase perturbation distribution $+\psi_{n,m}$ to the subaperture elements of one-half of a given set of subapertures. The second step shown in block 35 is the measurement of the resulting field intensity $I_{+n,m}$. The third step of block 36 is applying the phase perturbation to the other half of the subaperture elements of the given set; and the step designated by reference numeral 37 comprises measuring the resulting received field intensity $I_{-n,m}$. The measured field intensities from steps 35 and 37 are used by computer 24 of FIG. 1 to solve Equation (4) for the correct value of $-\theta_{n,m}$ as indicated in block 38. The step of block 39 comprises adding the computed value of phase offset $(-\theta_{n,m})$ to the control signal for each of the subapertures of one-half of the given set, said elements being designated as the positive element. As indicated in block 40, steps 34 through 39 are repeated for each of the applicable sets of subaperture elements; and steps 34 through 40 are recycled until the measured values of $I_{n,m}$ are less than K as depicted by block 41.

Figure 6:
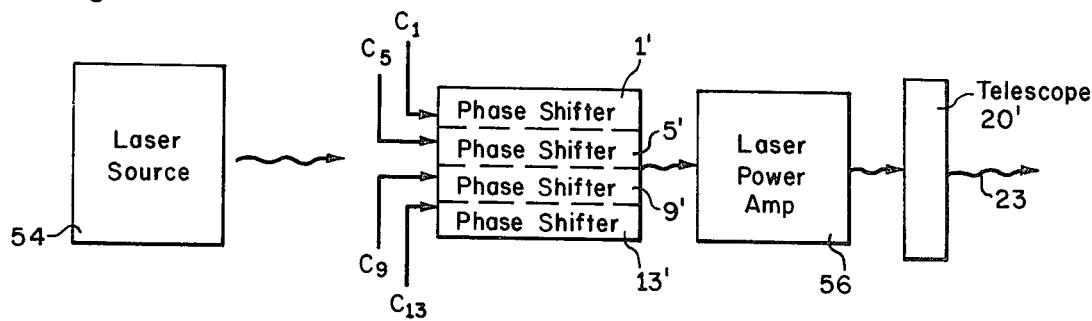
FIG. 6 is a block diagram which illustrates a portion of the phase control matrix and optical array of FIG. 1.

A portion of the control matrix 22 and optical array 20 are depicted in greater detail in FIG. 6 to which reference is now directed. As shown, a laser transmitter 54 applies energy through phase control matrix 22, one column of which is shown as comprising phase shifters 1', 5', 9', and 13'. The output signals from control matrix 22 is applied through laser amplifier 56 to transmitting telescope 20'. It is noted that the various subapertures shown in FIG. 1 are the corresponding areas of telescope 20' whose transmit energy is controlled by a phase shifter having a correspondingly designation. For example, subaperture 1 is defined by the portion of telescope 20' which transmits energy that is controlled by phase shifter 1'.

Figure 7:
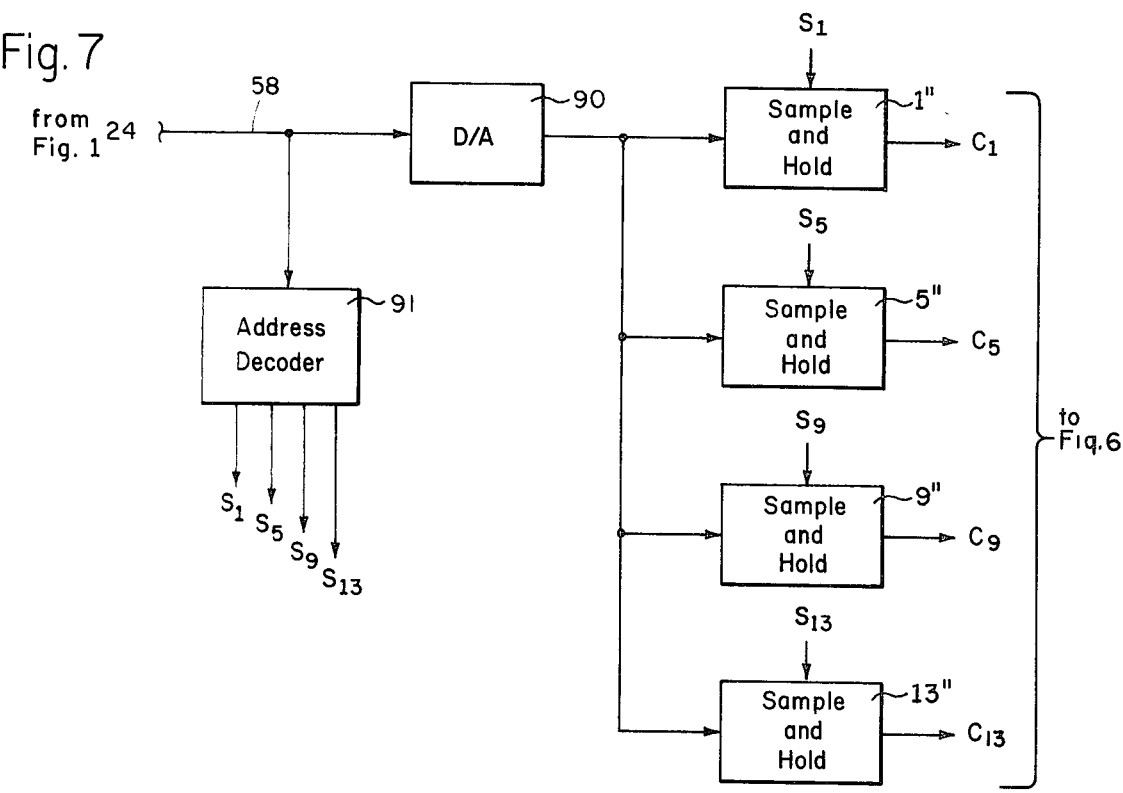
FIG. 7 is a block diagram which depicts one embodiment of a circuit for providing phase control signals to the control matrix of FIG. 1.

The amount of phase delay introduced by each of the phase shifters is controlled by a control signal having a corresponding subscript. For example, phase shifter 1' is controlled in response to an electrical signal $C_1$. The control signals are provided by the circuit of FIG. 7 which responds to output signals from computer 24 (FIG. 1) and which are applied thereto on cable 58. In the arrangement of FIG. 7, data as to the magnitude of the phase shift and the identification of the corresponding phase shifter is applied in a parallel digital format (word) to digital-to-analog converter 90 and to address decoder 91. The bits of each of the sequentially applied words which are indicative of the phase shift magnitude are digital-to-analog converter and applied in parallel to the input circuits of each of the sample and hold circuits. In FIG. 7, sample and hold circuits for the first column of subapertures i.e. 1, 5, 9, and 13 are shown and are identified by corresponding reference numerals with a double prime superscript. The sample and hold circuits are controlled by gating signals applied thereto from address decoder 91, which unit decodes the address portion of the data words applied from computer 24 (FIG. 1). For example, when the data word relative to subaperture 1 is read from computer 24 address decoder 91 enables sample and hold circuit 1'' such that the magnitude of the phase shift part of the data word is stored therein. It is noted that if desired the function implemented by the circuit of FIG. 7 may be provided by a portion of computer 24 with parallel output leads being provided to the various phase shifters to matrix 22. This approach would be particularly attractive if digitally controllable phase shifters are employed.

Figure 8:
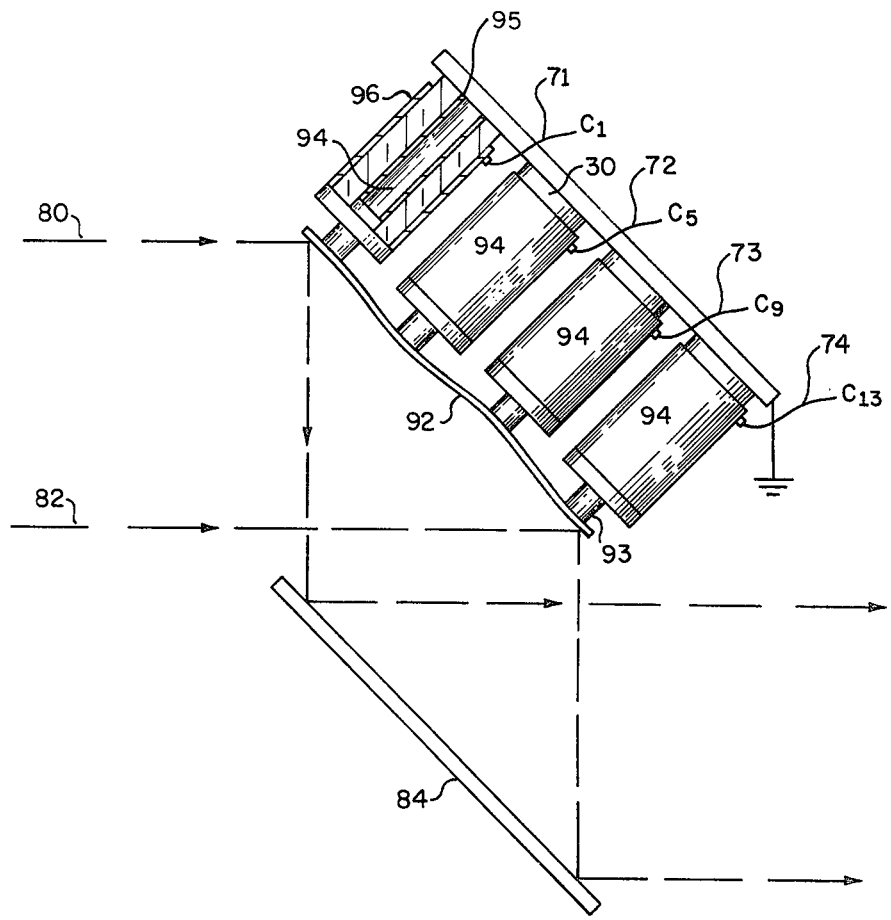
FIG. 8 depicts one embodiment of a phase shifter array suitable for use in the embodiment of FIG. 4.

One suitable phase shifter arrangement is shown in FIG. 8 as comprising a continuous metallic or glass sheet 92 having a highly polished, highly reflective surface attached at regular intervals to glass or ceramic members 93 which in turn are attached to one end of piezoelectric actuators 94. Actuators 94 are cylinders each of which have an electrode 95 plated onto an inner bore of the cylinder and an electrode 96 plated onto the outer periphery of each cylinder. The cylinders may be advantageously constructed of lead-zirconate titanate (PZT) material. Inner surfaces 95 are at ground potential and serve as a return electrical signal path. Wires 71, 72, 73, and 74 are electrically connected to the outer cylinder plates surfaces as at 96 for providing electrical connections to the circuit of FIG. 7. Electrically conductive ground plate 78 is provided for enabling electrical return paths from the phase shifters.

Still referring primarily to FIG. 8, optical beam 80 from laser source 54 (FIG. 6) impinges on reflective surface 92 and is reflected therefrom as beam 82 which is directed by mirror 84 through laser power amplifiers 56 (FIG. 6). Activators 94 act as displacement devices of segments of mirror 92 when the activators are stressed by electrical signals supplied thereto from the circuit of FIG. 7. Actuators 94 provide localized displacements as a function of applied control signals and the continuity of mirrored surface 92 provides a smoothly varying spatial phase function which is normally desirable for the type of system illustrated in FIG. 1. This results from the fact that atmospheric nonuniformities, for example, are more likely to be smooth varying functions than step functions. However, it is noted that if desired the smooth surface 92 may be replaced by discrete area mirrors associated with each of the cylinders whereby the phase delay imposed by each phase shifter varies stepwise across the control matrix 22.

Figure 4:
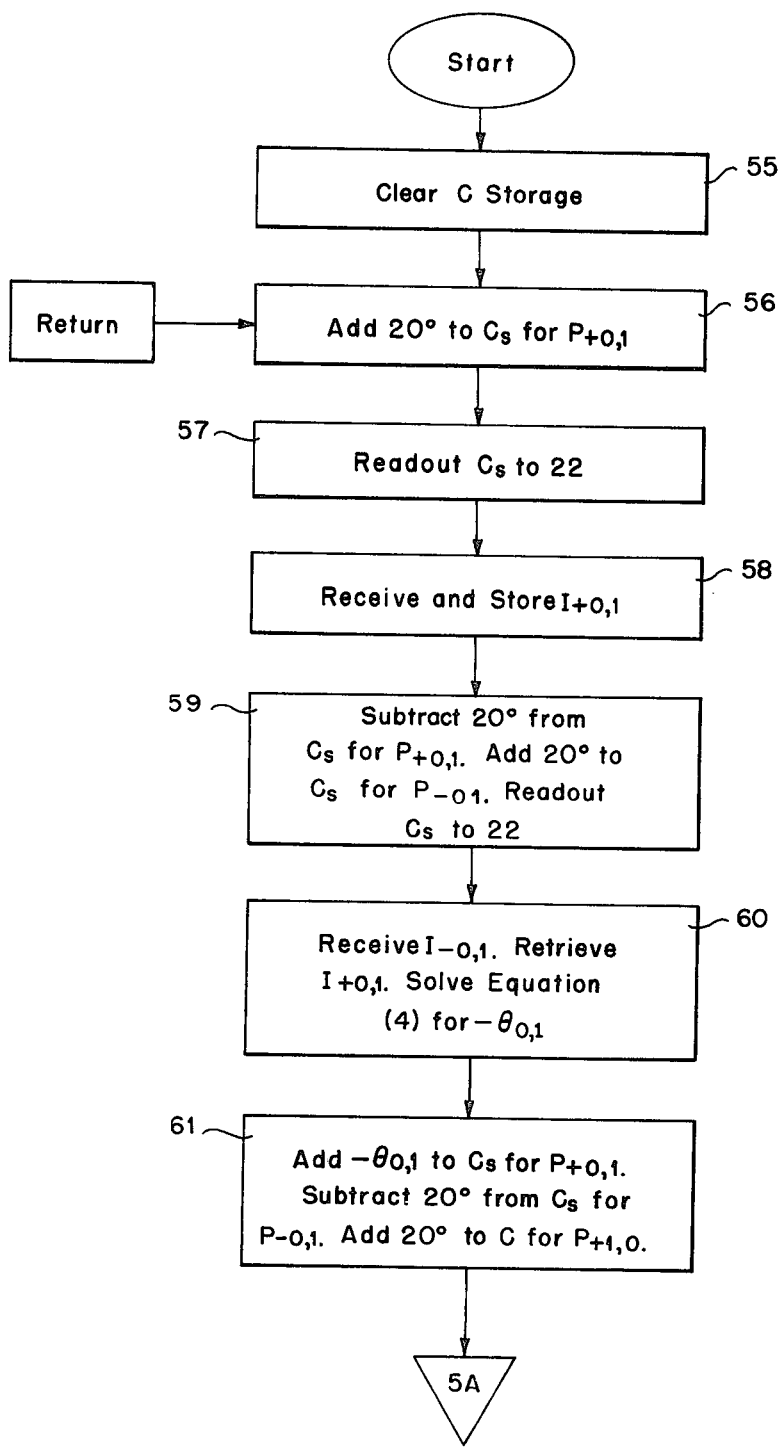
Figure 5:
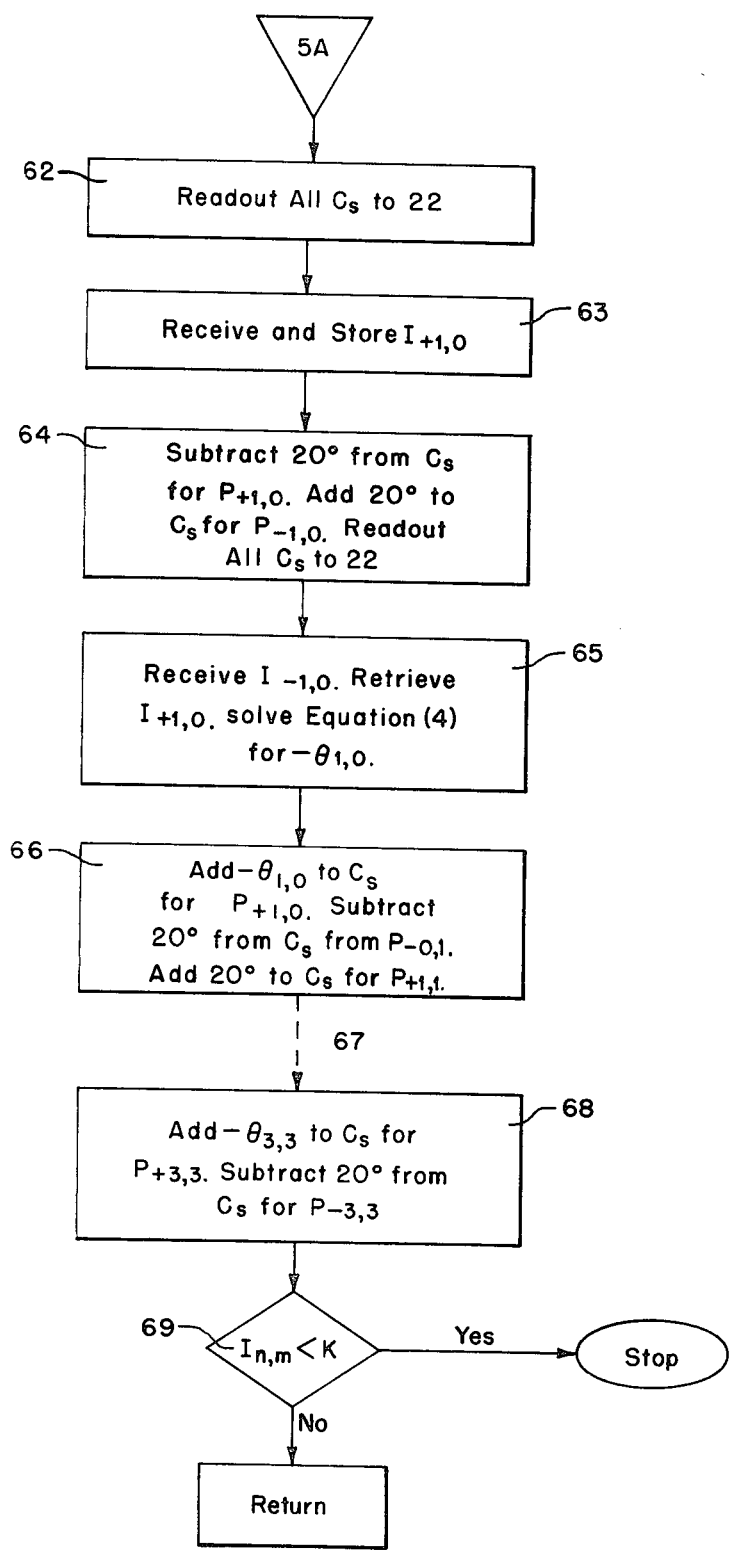

Reference is now directed primarily to FIGS. 4 and 5 which summarize the operation of computer control system 24. Following the start of operations, the control signals (Cs) for each of the phase shifters of phase control matrix 22 (FIG. 1) are initialized for zero phase shift (block 55). Next the controls signals (Cs) associated with the positive subaperture elements for spatial orthogonal set $P_{0,1}$ (FIG. 2) are set for a 20° phase shift. As used herein subapertures associated with the clear areas of the spatial orthogonal sets of FIG. 2 are arbitrarily referred to as positive elements. Also a 20° phase shift has been more or less arbitrarily selected by way of example. However, it will be understood that any suitable phase perturbation set may be utilized for particular system applications. Step 57 involves reading out the control signals for all of the phase shifters of control matrix 22. In the above described embodiment of FIG. 6 this readout will be a series stream of parallel bit data words with each word containing the address and magnitude of the corresponding phase shifter. Following step 57 the phase perturbation of the elements of array 20 will be as shown in FIG. 2 for spatial orthogonal set $P_{0,1}$; i.e. the subapertures of the left hand two columns of the array will have a 20° phase delay inserted while the subaperture of the right hand two columns will have zero phase delay.

The energy transmitted by optical array 20 will be reflected from target 26 (FIG. 1) and after being processed by receiver 30 and A to D converter 32 the magnitude of the far field intensity (designated $I_{+0,1}$) will be applied to computer 24 wherein it will be stored as indicated by block 58 of FIG. 4. Step 59 involves substracting the 20° phase delay from each of the control signals for the positive elements of set $P_{0,1}$; adding the 20° phase delay to the control signals for the negative elements of set $P_{0,1}$ and reading out the control signals to all of the phase shifters of matrix 22. This just described step implements the removal of the previously applied phase perturbation to the positive elements of set $P_{0,1}$ and the adding of this phase perturbation to the negative elements thereof. Hence a phase inbalance has been applied sequentially to each half of the set and the difference between the received field intensity for these two conditions will be used to estimate the degree of phase inbalance.

Following the insertion of the phase perturbation into the subapertures defined by the shaded area of FIG. 2 for set $P_{0,1}$ the received intensity from the target (designated $I_{-0,1}$) is received. The previously stored intensity $I_{+0,1}$ is retrieved from the computer's memory and the two signals are subtracted as indicated in Equation (4) and then Equation (4) is solved to obtain the value of $-\theta_{0,1}$. This last mentioned signal is an estimate of the phase error associated with subaperture of set $P_{0,1}$ and as indicated by block 61 is added to the control signals for the positive elements of that set. Also the 20° of phase perturbation which had previously been added to the control signals for the negative elements of said $P_{0,1}$ is removed. As a start of a next sequence associated with set $P_{1,0}$, a 20° phase shift is added to the control signals for the positive subaperture elements of set $P_{1,0}$.

Continuing now with a description of the operation of computer control system 24 as depicted on FIG. 5, the control signals for all the phase shifters of control matrix 22 are read out and the received far field intensity $I_{+1,0}$ is received and stored.

As shown in block 64 the next computer operation is to subtract out the previously applied phase perturbation of 20° from the control signals for the positive subaperture elements of set $P_{1,0}$ and to add a 20° phase delay to the control signals for the negative elements of that set. Here again a phase unbalance is first applied to one-half of a given orthogonal spatial set and then to the other and the change in the energy at the target is computed as a function of the difference in the received field intensity between the two transmission intervals. After the control signals stored in the computer following the last above mentioned operation are applied to the control matrix 22 and the resultant intensity $I_{-1,0}$ is received, the signal $I_{+1,0}$ is retrieved from memory and Equation (4) is solved for the coefficients of the phasing error ($-\theta_{1,0}$) associated with the set $P_{1,0}$.

Following the computation of the value of phase correction associated with set $P_{1,0}$ this value ($-\theta_{1,0}$) is added to the control signals for the positive elements of orthogonal spatial set $P_{1,0}$ and the previously applied phase perturbation of 20° is subtracted from the control signal associated with the negative subaperture elements.

The start of a similar sequence for orthogonal set $P_{1,1}$ is indicated by the last line of block 66 and the continuation of the above described sequence for set $P_{1,1}$ and the other remaining spatial orthogonal sets are indicated by dashed line 69 with the last two steps for the sequence associated with the final orthogonal spatial set $P_{3,3}$ being indicated by block 67.

Although in the interest of simplicity of the drawings it was not explicitly indicated therein, after the computation of the difference in the field intensity associated with each spatial orthogonal set ($I_{n,m}$), the value of this difference is compared to a preselected threshold value (K) and if it is equal to or greater than the threshold value a "no" decision is produced by the operation of block 67. Hence, if any of the terms $I_{n,m}$ are greater than or equal to K the operation returns to block 56 and the steps 56 through 66 are recycled. This recycling will result in substantial reductions in any residual unbalances in the phasing of the energy at the target and again the determination of whether or not the unbalances associated with any particular orthogonal set exceeds the threshold value is made in accordance with block 69. If the values for all sets are within the threshold limit then the "yes" command is generated and the phase correction process is terminated. Following the termination of the program it can be restarted manually or in accordance with some preprogrammed time sequence.

Thus having described a new and improved method of and apparatus for compensating for phasing errors in energy transmission systems, what is claimed is:

1. A method of controlling the relative phasing of a plurality of transmitted beams of electromagnetic energy such that the energy is substantially in phase at a remotely located target; said method comprising the steps of:
   a. identifying a plurality of spatial orthogonal sets of said plurality of beams, such that each set has a first portion comprised of some of said plurality of beams and a second portion comprised of the remaining ones of said plurality of beams;
   b. applying phase perturbations to the beams of the first portion of a given set and measuring the relative intensity of the transmitted energy reflected from the target;
   c. applying phase perturbations to the beams of the second portion of said given set and measuring the relative intensity of the transmitted energy reflected from the target;
   d. computing a phase value, based on the intensities measured in steps (b) and (c), which when inserted into the beams of one portion of said given set will substantially reduce the difference between said measured intensities of the reflected energy;
   e. applying said computed phase value to the beams of said one portion of said given set; and
   f. sequentially repeating steps (b) through (e) for each of said spatial orthogonal sets.

2. The method of claim 1 wherein said first and second portions each consists of one-half of said plurality of beams; and said step of applying phase perturbations comprise sequentially applying the same phase perturbations to each portion of said given set.

3. The method of claim 1 wherein said steps of applying said computed phase value comprise applying the phase value associated with each of said sets such that the composite phase value applied to a given beam is the algebraic sum of the computed phase values, applicable to said beam, which resulted from the processing associated with all of said sets.

4. The method of claim 1 further comprising the repetition of steps (b) through (f) until the difference between the measured intensities of step (d) is, for all sets, less than a preselected value.

5. The method of claim 1 wherein said spatial orthogonal sets are ordered as a function of their spatial frequencies, and said steps (b) through (e) are performed in a sequence which commences with a lower frequency set and progresses through each of said sets in an ascending order of their spatial frequency content.

6. A method for controlling the phasing of energy transmitted through a plurality of subapertures so as to provide spatial coherence of the energy at a remotely located target, said method comprising the steps of:
   a. identifying a plurality of spatial orthogonal sets of said plurality of subapertures, such that each set has a first portion comprised of some of said plurality of subapertures and a second portion comprised of the remaining ones of said plurality of subapertures and such that said first and second portions are of equal area,
   b. applying a constant preselected value of phase delay to the energy transmitted through the subapertures of one portion of a given set and measuring the relative intensity of the transmitted energy reflected from the target;
   c. removing the phase delay applied in step (b), applying said preselected value of phase delay to the energy transmitted through the subapertures of the remaining portion of said given set and measuring the relative intensity of the transmitted energy reflected from the target;
   d. removing the phase delay applied in step (c) and computing a phase delay value which when inserted into the energy path for each subaperture of one portion of said given set will substantially reduce the difference between said two measured intensities of the reflected energy;

e. applying said computed phase delay to the energy transmitted through each subapertures of said one portion of said given set; and f. sequentially repeating steps (b) through (e) for each of said spatial orthogonal sets of subapertures.

7. The method of claim 6 wherein said spatial orthogonal sets exhibit different spatial frequency characteristics, and said steps (b) through (e) are performed in a sequence which commences with a lower frequency set and progresses through each of said sets in an ascending order of their spatial frequency content.

8. The method of claim 6 further comprising the repetition of steps (b) through (f) until the difference between the two measured intensities of step (d) is, for all sets, less than a preselected value.

9. The method of claim 6 wherein said steps of applying said computed phase value comprise applying the phase value associated with each of said sets such that the composite phase value applied to a given beam is the algebraic sum of the computed phase values, applicable to said given beam, which resulted from the processing associated with all of said sets.

10. An electromagnetic energy transmission system which is adapted for providing spatial coherencey of the transmitted energy at a remotely located target, said system comprising:

means for transmitting a beam of electromagnetic energy, said means including a plurality of subapertures through which said beam is transmitted;

phase control means, responsive to applied control signals, for individually controlling the relative phasing of the energy transmitted through said subapertures;

means responsive tor received energy reflected from the target for providing intensity signals representative of the intensity of the received energy; and computer means for providing a first group of control signals to said phase control means so as to sequentially cause phase perturbations to be injected into each portion of each set of a plurality of spatial orthogonal sets of said subapertures with each of said sets having a first portion comprised of some of said plurality of subapertures and a second portion comprised of the remaining ones of said plurality of subapertures, for sequentially computing the relative size of the phase correction for the subapertures as a function of said intensity signals associated with each spatial orthogonal set and for sequentially providing a second group of control signals to said control means so as to cause said phase corrections to be applied to the energy transmitted through said subapertures.

* * * * *